United States Patent
Schneider et al.

(10) Patent No.: US 12,240,315 B2
(45) Date of Patent: Mar. 4, 2025

(54) DEVICE FOR CLOSING A MOTOR VEHICLE COOLING MODULE

(71) Applicant: HBPO GmbH, Lippstadt (DE)

(72) Inventors: Christian Schneider, Bad Lippspringe (DE); Reinhold Brückner, Herzebrock-Clarholz (DE)

(73) Assignee: HBPO GmbH, Lippstadt (DE)

( * ) Notice: Subject to any disclaimer, the term of this patent is extended or adjusted under 35 U.S.C. 154(b) by 445 days.

(21) Appl. No.: 17/624,469

(22) PCT Filed: Jun. 29, 2020

(86) PCT No.: PCT/EP2020/068212
§ 371 (c)(1),
(2) Date: Aug. 10, 2022

(87) PCT Pub. No.: WO2021/001301
PCT Pub. Date: Jan. 7, 2021

(65) Prior Publication Data
US 2022/0371430 A1    Nov. 24, 2022

(30) Foreign Application Priority Data
Jul. 3, 2019   (DE) ..................... 10 2019 117 986.6

(51) Int. Cl.
*B60K 11/08*    (2006.01)
(52) U.S. Cl.
CPC ................... *B60K 11/085* (2013.01)
(58) Field of Classification Search
CPC .............................. B60K 11/085; Y02T 10/88
See application file for complete search history.

(56) References Cited

U.S. PATENT DOCUMENTS 3,666,194 A * 5/1972 Gosnell ................... B21C 47/30
                                                    242/586.4
6,390,217 B1 * 5/2002 O'Brien ................ B60K 11/04
                                                    160/DIG. 1
(Continued)

FOREIGN PATENT DOCUMENTS

DE    10 2014104041         9/2015
DE    20 2017102954 U1      6/2017
(Continued)

*Primary Examiner* — Kurt Philip Liethen
(74) *Attorney, Agent, or Firm* — Thorpe North & Western, LLP

(57) ABSTRACT

The invention relates to a device (2) for closing a motor vehicle cooling module, comprising a first and a second closing element (4a, 4b) for closing air inlets (6) in a motor vehicle, a first and a second guide element (8a, 8b) for guiding the closing elements (4a, 4b) during an opening and a closing movement, respectively a first and a second control element (10a, 10b) for controlling an opening and a closing movement of the closure elements (4a, 4b), the closure elements (4a, 4b) and the guide elements (8a, 8b) being arranged relative to one another and being controllable by the control elements (10a, 10b) in such a way that air inlets (6) in a motor vehicle are guided by the closure elements (4a, 4b) along a vehicle width (B), it being possible for two air inlets (6) arranged opposite one another along a vehicle width (B) to be opened and closed simultaneously by the closure elements (4a, 4b), the closure elements (4a, 4b) and the guide elements (8a, 8b) are arranged relative to one another and can be controlled by the control elements (10a, 10b) in such a way that the closure elements (4a, 4b) can be opened during an opening movement from the vehicle centre (M) towards the vehicle outer regions (A1, A2) and can be opened during a closing movement from the vehicle outer regions (A1, A2) towards the vehicle centre (M).

21 Claims, 9 Drawing Sheets

(56) References Cited

U.S. PATENT DOCUMENTS

Figure 1:
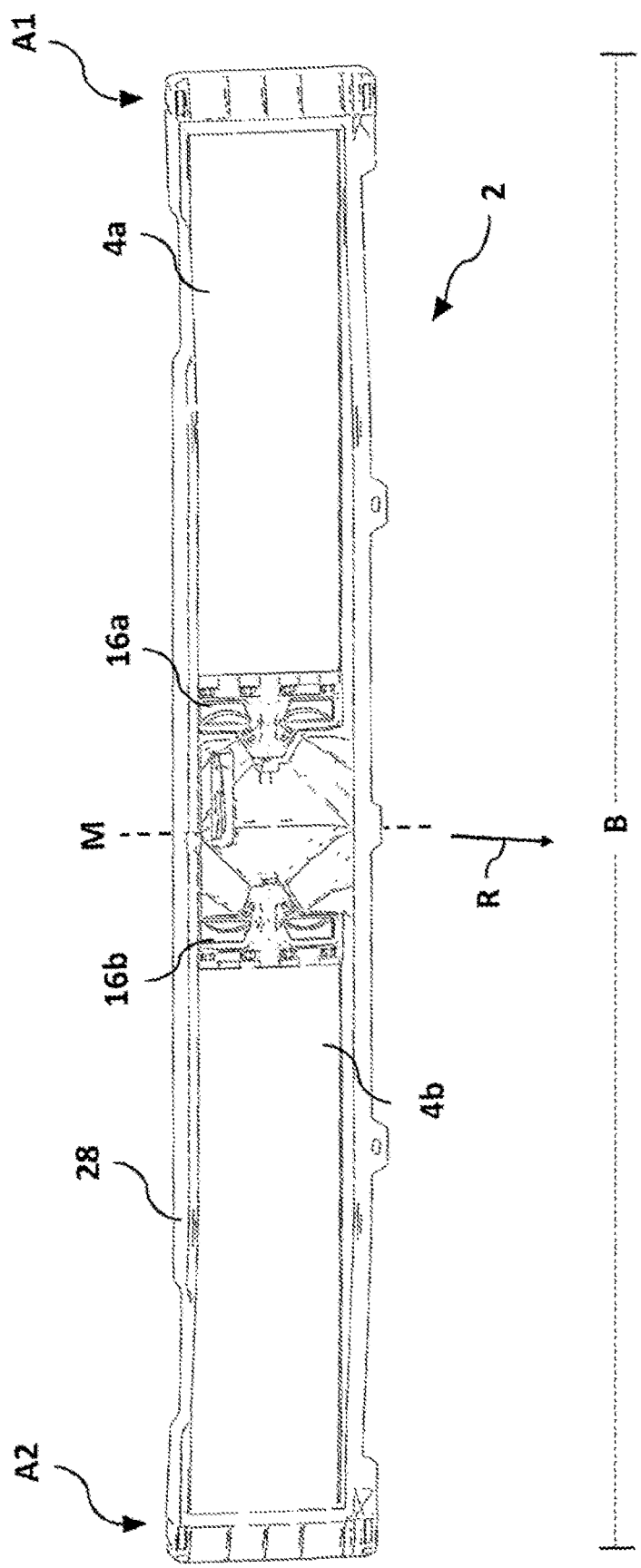

| | | | | |
|---|---|---|---|---|
| 8,473,164 | B2* | 6/2013 | Charnesky | B60K 11/085 |
| | | | | 123/41.04 |
| 8,627,911 | B2* | 1/2014 | Tregnago | B60K 11/085 |
| | | | | 180/68.1 |
| 8,814,638 | B2* | 8/2014 | Hasegawa | B60K 11/085 |
| | | | | 454/75 |
| 10,118,480 | B2* | 11/2018 | Yasui | B60K 11/085 |
| 10,479,193 | B2* | 11/2019 | Shimizu | B60K 11/04 |
| 11,180,020 | B2 | 11/2021 | Droulez et al. | |
| 2011/0232865 | A1* | 9/2011 | Mildner | F01P 7/10 |
| | | | | 165/96 |
| 2017/0334284 | A1 | 11/2017 | Drozdowski et al. | |
| 2019/0009667 | A1 | 1/2019 | Steffen et al. | |
| 2020/0156461 | A1* | 5/2020 | Droulez | B60K 11/04 |

FOREIGN PATENT DOCUMENTS

| | | |
|---|---|---|
| DE | 10 2017211577 A1 | 1/2019 |
| FR | 3063338 A1 | 8/2018 |
| WO | WO 2018158513 A1 | 9/2018 |

* cited by examiner

DEVICE FOR CLOSING A MOTOR VEHICLE COOLING MODULE

The present invention relates to a device for closing a motor vehicle cooling module.

In modern vehicles, in particular in motor vehicles, fresh air flowing in through a radiator grille of the vehicle or through the openings of the radiator grille is channelled and directed onto a cooling module of the vehicle. In particular, this targeted channelling of the air flow onto the cooling module can ensure that, according to the design of the cooling module, for example an engine of the vehicle and/or charge air for this engine can be efficiently cooled and/or the interior of the vehicle can be efficiently air-conditioned.

Adversely, turbulent flows are generated by the inflowing air flow, which counteract the locomotion of the vehicles concerned and lead to reduced ranges or increased fuel consumption. In order to solve this problem, roller blind systems are known from the prior art which can close the air inlets arranged within the engine compartment if required and can thus reduce the generation of turbulent flows. However, the systems known in the prior art for closing air inlets arranged in the engine compartment have the problem that they are not able to open or close, as required, only partial areas of a vehicle interior arranged symmetrically with respect to each other on opposite sides along the width of the vehicle. For example, in many motor vehicles, brake air ducts are arranged at the outer regions of the front areas of the motor vehicle, which, in a disadvantageous manner, usually cannot be closed separately.

It is therefore an object of the present invention to at least partially overcome the aforementioned disadvantages of known closure systems. In particular, it is the object of the invention to provide a device for closing a motor vehicle cooling module which permits, in a simple and inexpensive manner, the most precise, controllable and flexibly operable opening and closing of air inlets of a vehicle arranged along a vehicle width.

The foregoing problem is solved by a device having the features of the independent device claim. Further features and details of the invention result from the dependent claims, the description and the drawings.

According to the invention, a device for closing a motor vehicle cooling module is provided, which has a first and second closing element for closing air inlets in a motor vehicle, a first and second guide element for guiding the closing elements during an opening and a closing movement, and a first and second control element for controlling an opening and a closing movement of the closing elements. In accordance with the invention, the closure elements and the guide elements are arranged relative to one another and can be controlled by the control elements in such a way that air inlets in a motor vehicle can be opened and closed by the closure elements along a vehicle width, it being possible for two air inlets arranged opposite one another along a vehicle width to be opened and closed simultaneously by the closure elements. The present device is characterized in particular by the fact that the closure elements and the guide elements are arranged relative to one another and can be controlled by the control elements in such a way that the closure elements can be moved from the vehicle centre towards the vehicle outer regions during an opening movement and from the vehicle outer regions towards the vehicle centre during a closing movement.

The present device for closing a motor vehicle cooling module can preferably be arranged in the front area of a motor vehicle, in particular between a radiator grille or a front hood and a motor vehicle cooling module. In addition to being used in passenger cars and trucks, the device according to the invention can likewise be used in other motorized vehicles, such as ships or flying objects or the like. Preferably, the present opening operation taking place from the inside to the outside and the closing operation taking place from the outside to the inside can be performed by an interaction between the subject control elements and the guide elements according to the invention and the closing elements in order to close or open air inlets arranged along a width of the vehicle. Such air inlets may be formed, for example, in the form of brake air ducts or supply air ducts for the engine compartment or for an air conditioning system or the like. Here, the present closure elements can preferably be brought into any number of intermediate positions, so that, in addition to a fully open and a fully closed state, it is preferably also possible to realize partially open or partially closed states. In the context of the invention, an opening and a closing along a vehicle width is to be understood in particular as a horizontal movement with respect to a vehicle width. According to the present arrangement, the first guide element is preferably provided for winding up the first closure element, while the second guide element is provided for winding up the second closure element.

Within the scope of the invention, it has been recognized that by a movement of a first and a second closure element along a vehicle width, wherein the movement from a vehicle center to the vehicle outer regions takes place simultaneously from two positions arranged opposite one another along a vehicle width symmetrically converging towards one another or diverging from one another, partial regions of an engine compartment arranged symmetrically along a vehicle width can be cooled as required. In particular, via the opening provided in accordance with the invention from a vehicle centre towards the vehicle outer regions or via the closing provided in accordance with the invention from the vehicle outer regions towards the vehicle centre, it is furthermore possible to supply cooling air only to a centrally arranged vehicle front region and, for example, to be able to exclude brake air ducts arranged exclusively in the side regions of a vehicle front from ventilation, which has proved to be advantageous for some applications.

With regard to a particularly lightweight design as well as an opening and closing process which is at the same time simple and gentle on the material, it can be provided in accordance with the invention in particular that the closure elements are formed in the form of a textile. In order to ensure the most effective possible shielding of an air flow, the closure elements are here preferably formed in the form of at least partially air-impermeable textiles, which are preferably formed from a synthetic and preferably tear-resistant material, such as polyester or polyamide or the like. Here, the closure elements may also be provided with an at least partially air-impermeable coating or the like. Preferably, the closure elements further comprise a dirt-repellent surface, or are provided with a dirt-repellent coating or the like. With regard to a simple and flexible guiding of the closure elements during an opening and a closing movement, the closure elements may further advantageously have a textile thickness of 0.15-0.3 mm, in particular a fabric thickness of 0.25 mm.

In the context of a simple and inexpensive way of producing a stable form-fitting connection between the subject closure elements and the guide elements according to the invention, the closure elements can in particular have sections which are kedered at the ends for producing a stable connection to the guide elements, wherein the sections can preferably be kedered in a cylindrical shape. In this case, the piping can preferably be in the form of rails, in particular in the form of aluminium rails or the like.

With regard to a space-saving and compact arrangement as well as a simultaneously effective and low-wear guidance of the closure elements during an opening and a closing movement, it can also be provided within the scope of the invention that the guiding elements are formed in the form of a winding shaft onto which the closure elements are wound during an opening movement and from which the closure elements are unwound during a closing movement.

Within the scope of a simple and inexpensive way of producing a stable connection between the present closure elements and the guiding elements according to the invention, the guiding elements, which are preferably formed in the form of winding shafts, can have a recess arranged on the longitudinal side for the introduction of the closure elements, the recess preferably comprising a taper for fixing the closure elements. The recess arranged on the longitudinal side can in this case be formed in particular in the form of a slot or the like, into which a closure element can be introduced. Moreover, the closure elements can then be fixed in a simple manner via a taper of the slot. In this case, it is particularly suitable to fix the closure elements by clamping a section of the closure elements which is kedered at the end.

Within the scope of a simple and stable guiding of the present device, it can further be provided according to the invention that the guiding elements are arranged at the outer regions of the device, wherein the guiding elements preferably have the same distance to the center of the device. The guiding elements, which are preferably in the form of winding shafts, are here advantageously aligned vertically, the first guiding element or the first winding shaft being provided in particular for winding and unwinding the first closure element, whereas the second guide element or the second winding shaft is provided in particular for winding and unwinding the second closure element.

With regard to a space-saving and compact arrangement as well as a simultaneously precise, effective and low-wear control of the closure elements during an opening and a closing movement, it can be provided within the scope of the invention that the control elements are formed in the form of shafts and cable pulls arranged on the shafts in each case, preferably two cable pulls being provided for the first control element and two cable pulls being provided for the second control element. In this case, the cable pulls can preferably be formed in the form of thin and stable wires, in particular in the form of fine cables made of stainless steel or the like.

Within the scope of a particularly stable and robust design, the cable pulls can also be formed in the form of Bowden cables or the like.

With regard to a space-saving, compact and stably controllable arrangement, it is particularly advantageous if the first control element is provided for closing the closure elements, the first control element being connected to the closure elements in such a way that the closure elements can be unwound from the guiding elements during a closing movement, while the cables of the first control element can be wound onto the first control element.

Furthermore, with regard to a space-saving, compact and stably controllable arrangement, it is particularly advantageous if the second control element is provided for opening the closure elements, wherein the second control element is connected to the closure elements in such a way that the closure elements can be wound onto the guiding elements during an opening movement, while the cable pulls of the second control element can be unwound at least partially from the second control element.

Within the scope of a reliable and stable control of an opening and a closing movement of the present closure elements, it can be provided according to the invention in particular that the second control element comprises a first centrally arranged part and a respective second part arranged in the outer regions, preferably on the first and second guide element, wherein the first part is connected to the two second parts preferably via cable pulls. During an opening movement, the cable pulls are here unwound in particular from the centrally arranged first part and wound onto the second parts arranged in the outer regions. During a closing movement, the reverse is advantageously the case.

With regard to a preferably constant tensile stress on the closure elements during an opening and a closing process, it can further be provided according to the invention that the control elements are at least partially conically shaped, preferably double conically shaped, wherein a first conically shaped part is connected, in particular along a waisted region, to a second conically shaped part. In this case, the taper serves in particular to compensate for an increase or decrease in diameter due to the unwinding and winding of the closure elements around the guide elements.

In order to ensure a stable fastening of the closure elements to the control elements, it is further conceivable that a first and a second end strip are provided for fastening the closure elements to the control elements. The end strips can preferably be formed from plastic and, in particular, can be detachably connected to the closure elements. The end strips may preferably comprise holes for fastening a cable or the like, which are preferably arranged along the end strips perpendicular to the opening or closing movement of the closure elements.

Within the scope of a particularly simple, in particular detachable connection between the end strips and the closure elements, it can be provided in accordance with the invention in particular that the end strips comprise a first end strip element and a second end strip element for fastening the closure elements, wherein the closure elements can preferably be clamped between the first and second end strip elements.

In this respect, it is particularly conceivable that the closure strips comprise clip connections for fastening the closure elements, the clip connections preferably being formed in the form of clips arranged in the first closure strip element and corresponding recesses arranged in a second closure strip element. Such an embodiment with clip connections allows, in particular, to dispense with any other connecting elements which, in the case of detachable connecting elements, may frequently be lost or, in the case of non-detachable connections, do not allow replacement of subject closure elements.

With regard to a stable guiding of the present closure elements during an opening and a closing movement, according to the invention it may further be provided that the closure strips comprise an intermediate element for stabilizing a guide, wherein the intermediate element may preferably be formed in the form of a T-profile-shaped guide.

For the purpose of exerting a permanent tensile stress during an opening and a closing process, it can further be provided in accordance with the invention that a tension element/tension means is provided for connecting the end strips and/or the closure elements to the first control element, the tension element preferably being formed in the form of a spring element, in particular in the form of a tension spring. With regard to a structurally particularly simple embodiment, the closure elements can be connected here, for example, to the first and second control cables via tension springs. With regard to a sensible selection of tension element, a tension element for exerting a tensile or spring force of 20-50 N, preferably of 30-40 N, in particular for exerting a tensile or spring force of 35 N, are advantageously suitable for common applications of closure systems for motor vehicle cooling modules.

Within the scope of a connection between the first control element and the closure elements that is easy to construct, it is further conceivable that the end strips comprise a recess for the introduction of the cable pull of the first control element, the recess preferably being arranged opposite a clip connection point. Preferably, the end strips are designed in such a way that they enable a traction element to be accommodated and a cable of the first control element to be introduced, so that the end strips can each be connected, on one side, preferably via a clip connection, to an objective closure element and, on the other side, can be connected to the first control element via a tension element, it being possible for the tension element, within the framework of a compact arrangement, preferably to be arranged inside the end strips.

In order to ensure remotely controllable opening and closing of a closure element, it is further advantageous if a drive/drive means is provided for driving the control elements. Here, the drive can preferably be formed in the form of an actuator, in particular in the form of a rotary axis actuator, which provides the torque necessary for a movement of the closure elements.

Within the scope of a particularly effective, energy- and space-saving drive, it can be provided according to the invention in particular that a centrally arranged drive shaft is provided, wherein the drive shaft preferably comprises the drive and/or the first control element and/or at least parts of the second control element, in particular the first part of the second control element.

With a view to a stable and low-wear arrangement which withstands even greater forces, it may further be provided according to the invention that a frame and/or a grid is provided for receiving and supporting the closure elements. In addition to receiving or supporting the closure elements, the frame and/or the grid may also be provided for arranging or fixing the guide elements and/or the drive element or the like. Alternatively or cumulatively to a grid, a different type of support, for example a curved and/or cambered support, may be provided to continuously hold the closure elements under a slight tension.

With regard to an automated adaptation of the positioning of the device according to the invention to determinable variables, such as a current speed, a current consumption, a current outside temperature, a current engine temperature, a current brake load, a current tank filling or the like, it can further advantageously be provided that a detection unit is provided for acquiring data for determining a current position of the closure elements with respect to a vehicle width and/or a current temperature and/or a current tensile stress and/or a current speed and/or a current energy consumption. Preferably, it may thereby be provided within the scope of the invention that the detection unit comprises at least one sensor for detecting said data. In this regard, with respect to a compact and easily replaceable embodiment, it may in particular be advantageous if the detection unit is arranged in the device according to the invention for closing a motor vehicle cooling module. Alternatively, the detection unit may be arranged remotely from the device and preferably integrated in a control unit or the like. With regard to an automatable adaptation of a positioning of the device according to the invention, in particular an interaction of sensors of the detection unit with sensors arranged within a vehicle can be advantageously carried out in this case, so that already existing sensor technology can be used in a simple manner.

With regard to a particularly precise determination or a control of a positioning of the device according to the invention that is as precisely controllable as possible, it can advantageously further be provided that a processing unit is provided for sending a control command to the drive on the basis of the acquired data. The processing unit is here advantageously capable of processing data on the basis of a plurality of sensors, for example averaging, weighting or the like, in order additionally to increase the informative value of the data before a control command is issued to the drive on the basis of the processing. For smooth control and communication of the individual components, such as the detection unit, the processing unit and the various sensors with each other, the components may preferably be interconnected within the scope of a wired embodiment by means of a communication and control line. With regard to a particularly flexible, uncomplicated and efficient communication of the individual system units, the individual components can preferably communicate with each other wirelessly or contactlessly on a server or cloud basis and/or via the Internet.

It is also an object of the invention to provide a motor vehicle comprising a device for locking a motor vehicle as described above.

Further advantages, features and details of the invention will be apparent from the following description, in which embodiments of the invention are described in detail with reference to the drawings. The features mentioned in the claims and in the description may be essential to the invention individually or in any combination.

Figure 2:
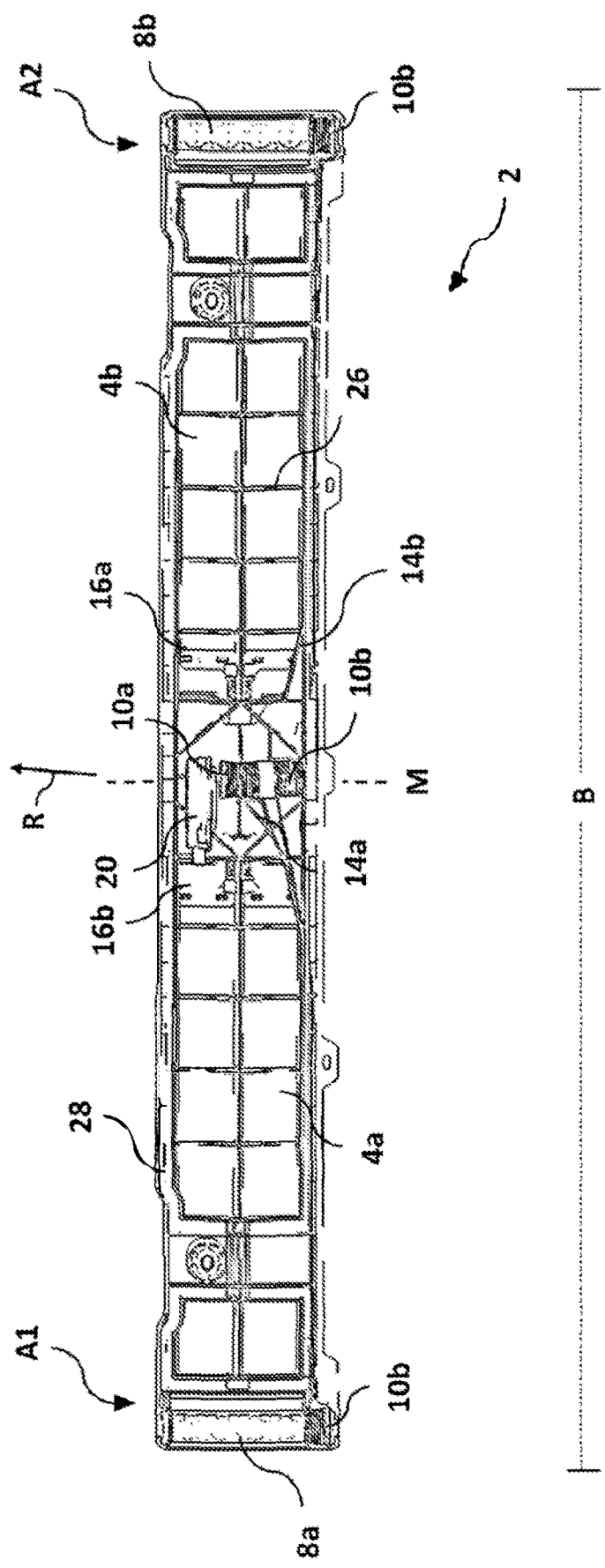
Figure 3:
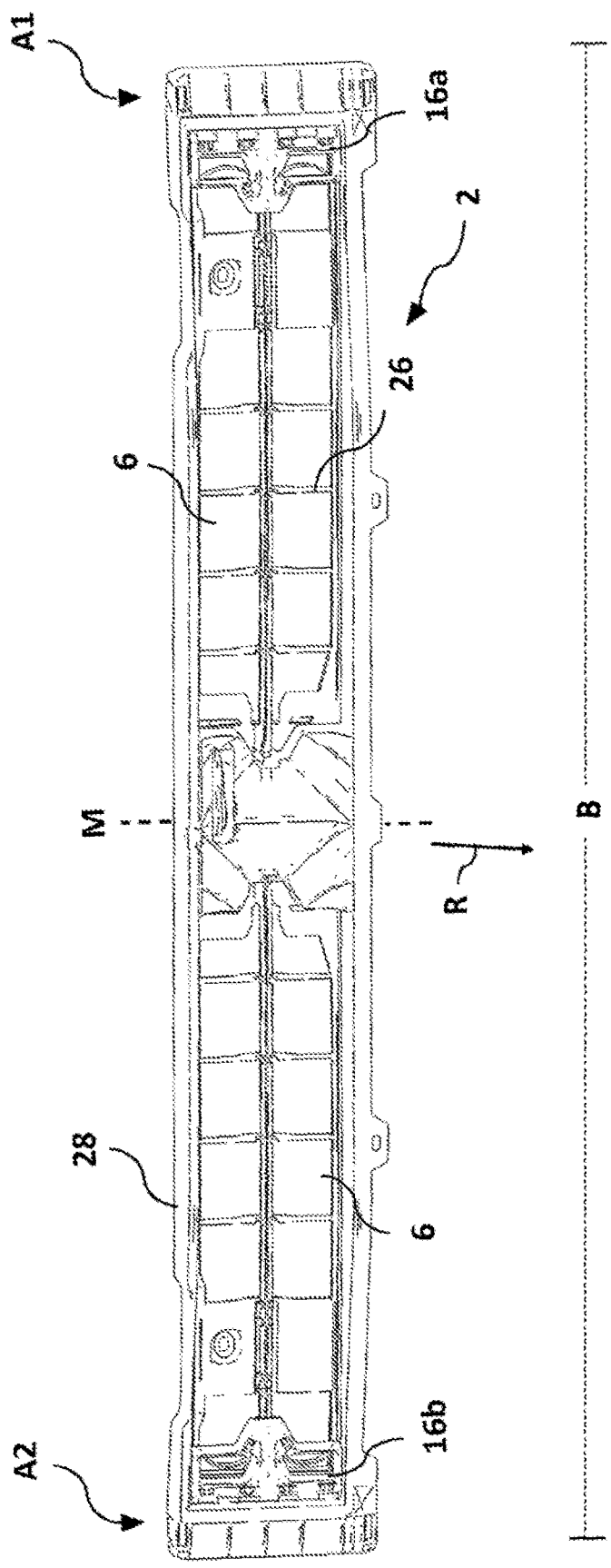
Figure 4:
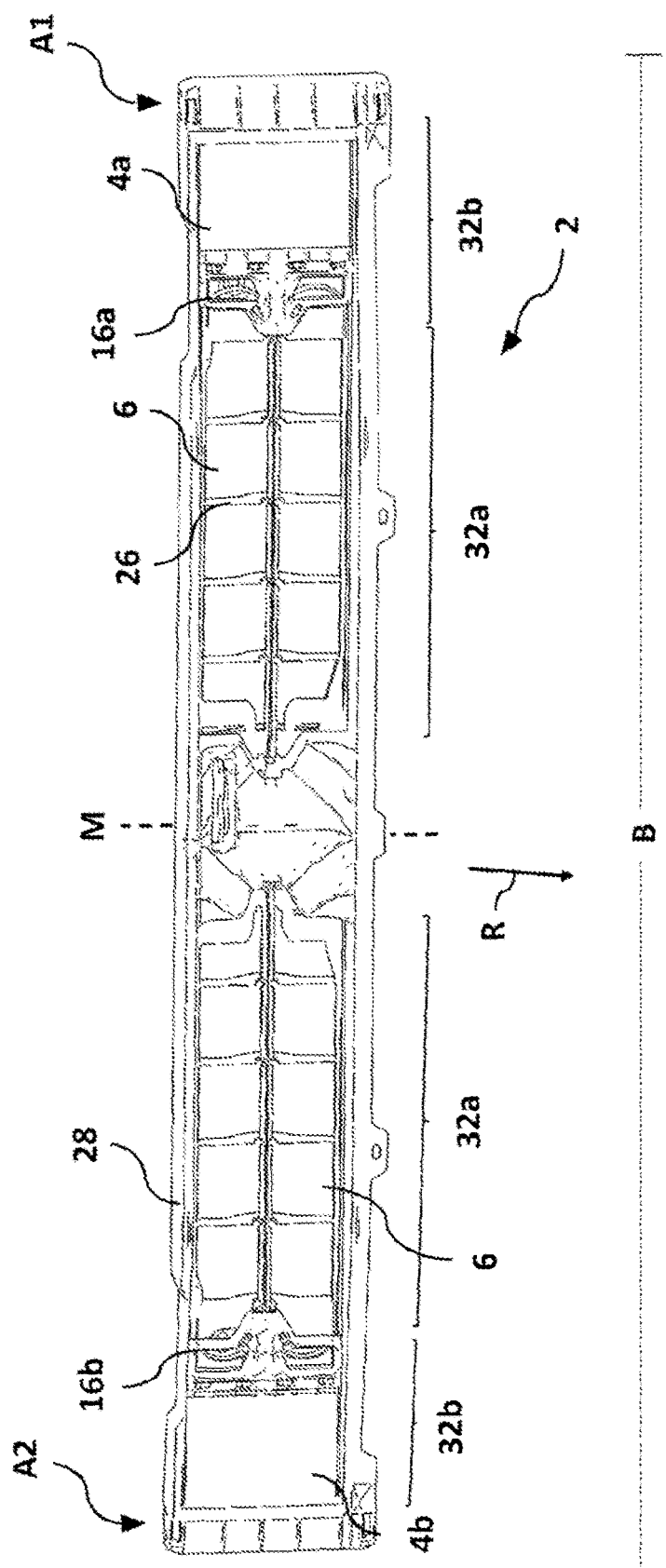
Figure 5:
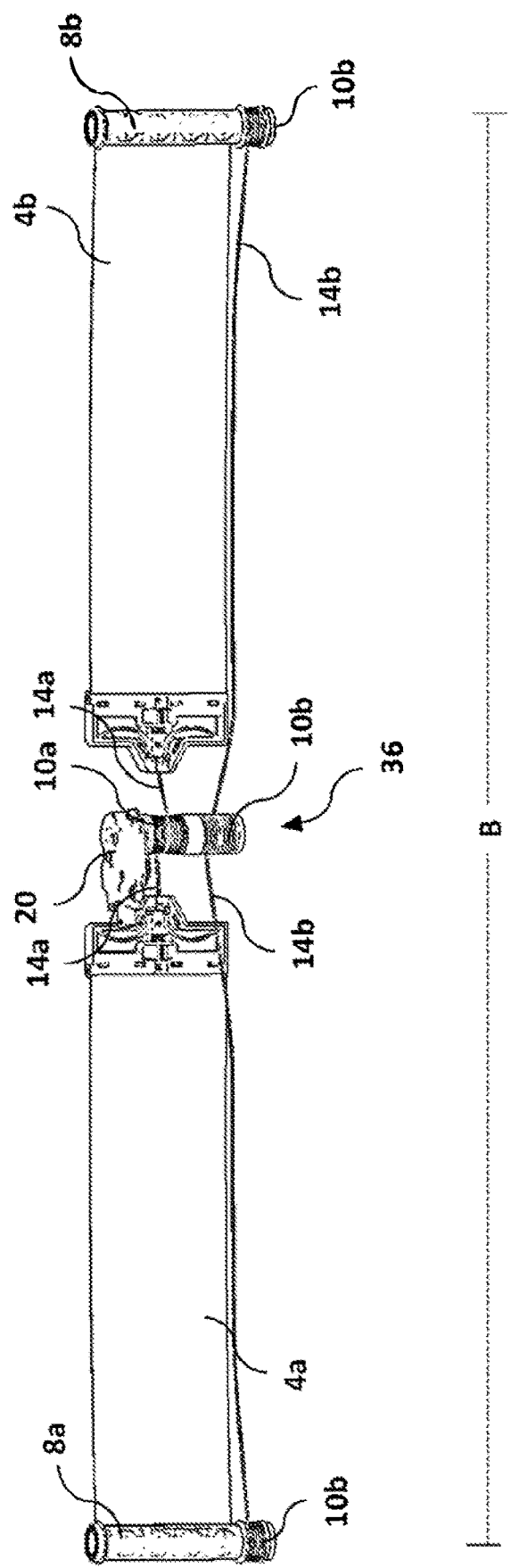
Figure 6:
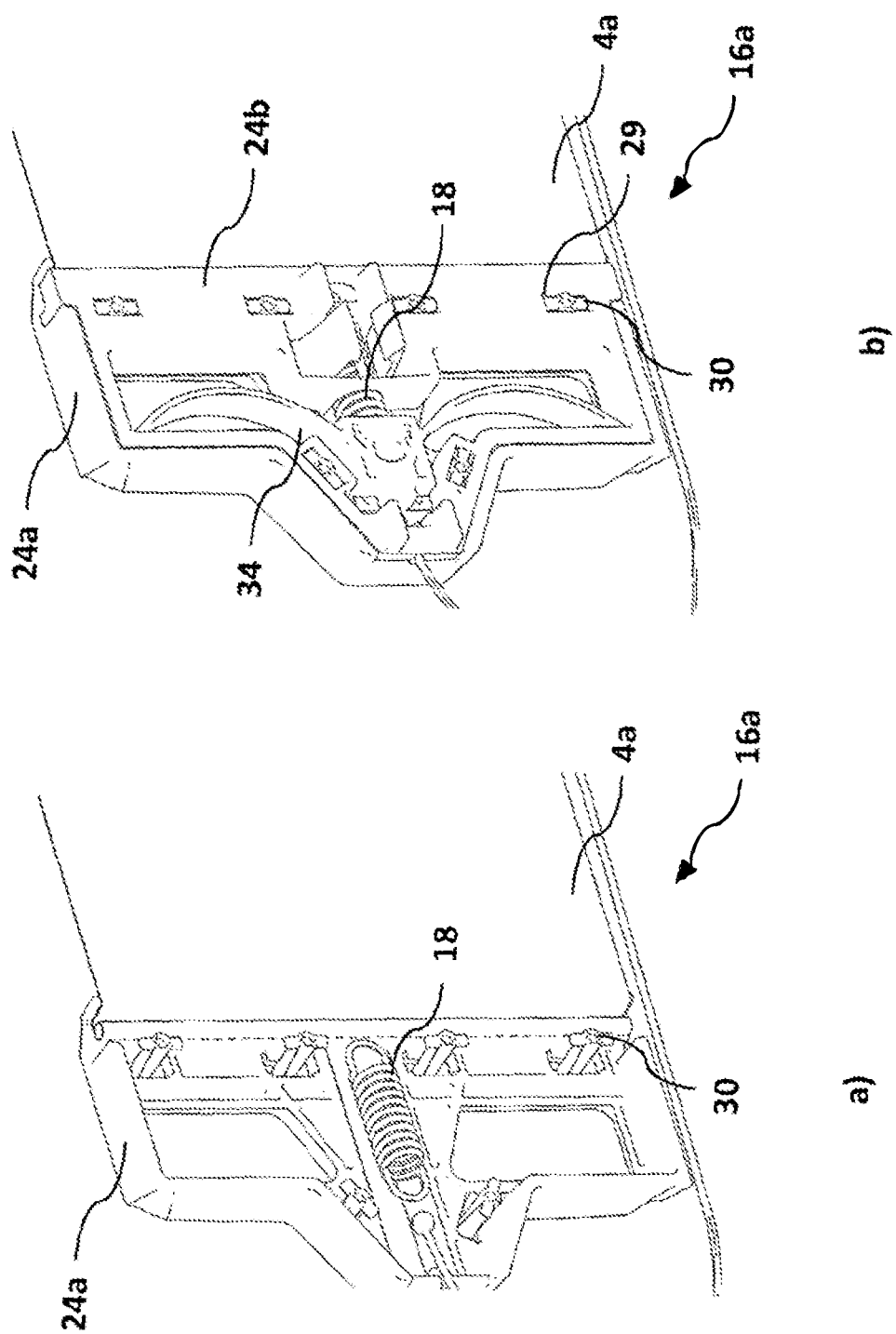
Figure 7:
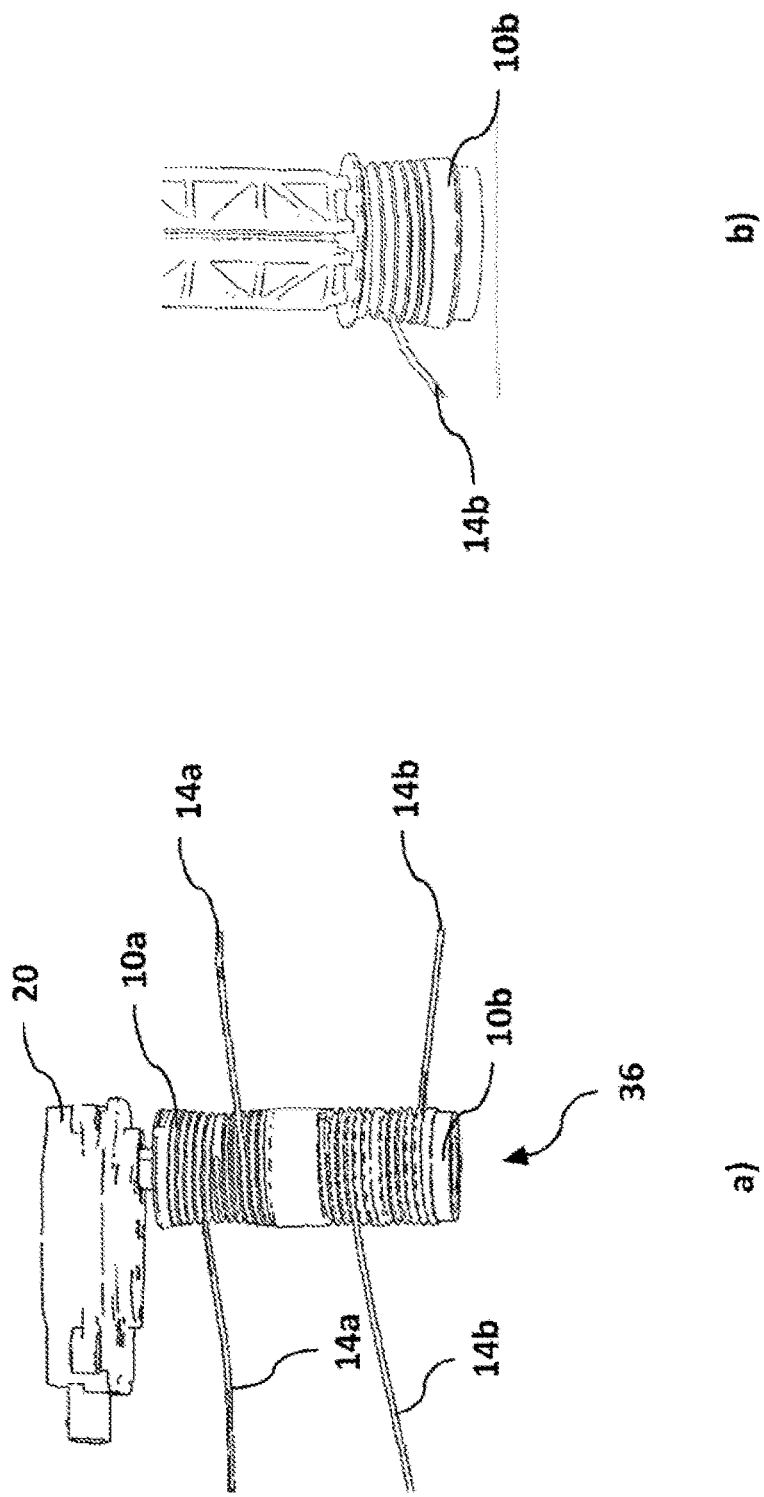
Figure 8:
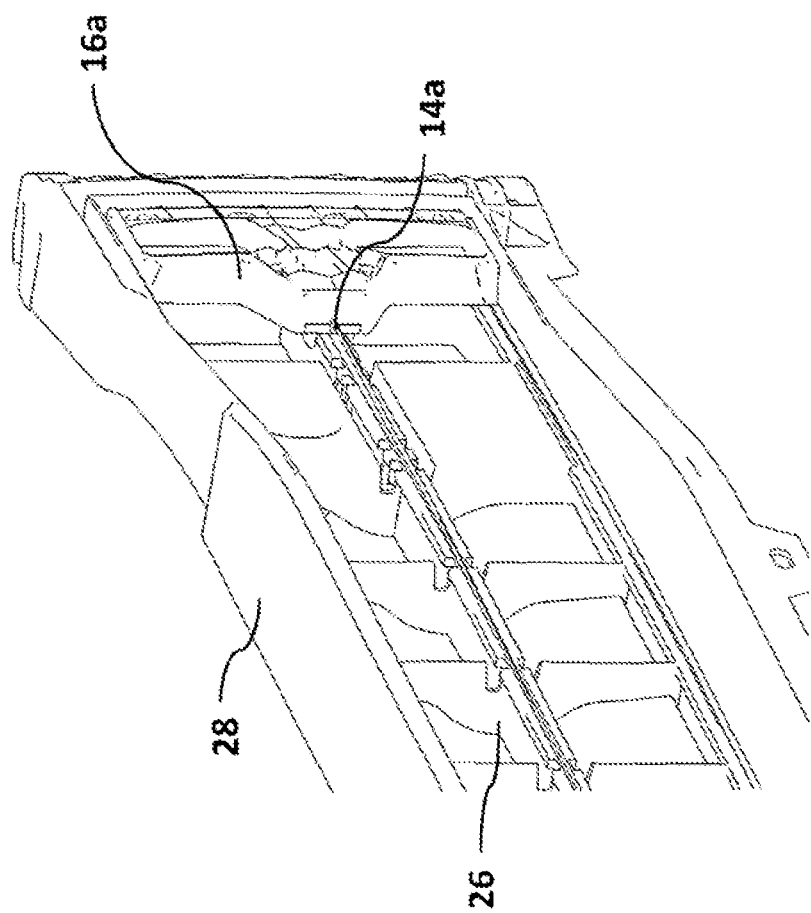
Figure 9:
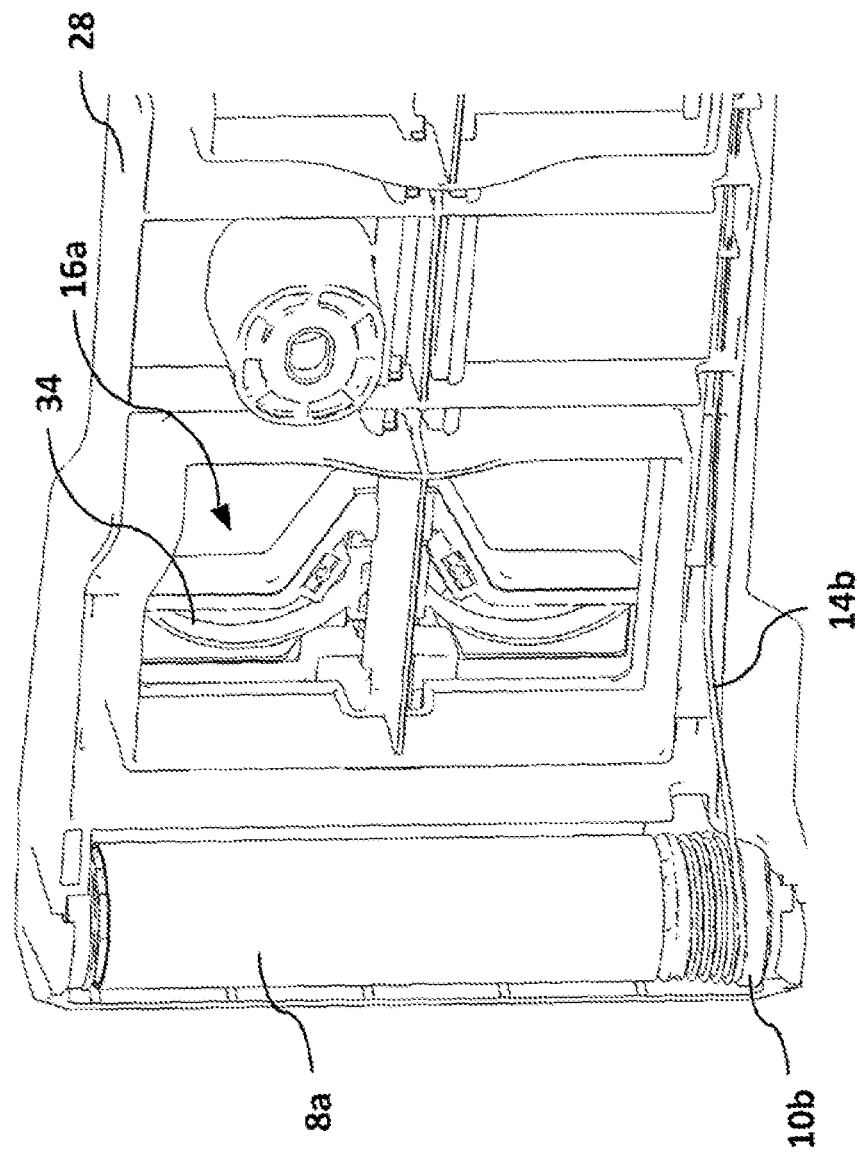

The figures show as follows:

FIG. 1 a schematic representation of a device according to the invention for closing a motor vehicle cooling module in a fully closed state in a front view according to a first embodiment, FIG. 2 a schematic representation of a device according to the invention for closing a motor vehicle cooling module in a fully closed state in a rear view according to a second embodiment, FIG. 3 a schematic representation of a device according to the invention for closing a motor vehicle cooling module in a fully open state in a front view according to a first embodiment, FIG. 4 a schematic representation of a device according to the invention for closing a motor vehicle cooling module in a partially closed state in a front view according to a first embodiment, FIG. 5 a schematic representation of a part of the device according to the invention for closing a motor vehicle cooling module in a fully closed state, in a rear view according to a first embodiment, FIG. 6a, b a schematic representation of a closure strip according to the invention in an open state (FIG. 6a) and a closed state (FIG. 6b), FIG. 7a, b a schematic representation of the control elements according to the invention for controlling an opening and a closing movement of a closure element according to the invention, FIG. 8 a schematic representation of a part of the device according to the invention for closing a motor vehicle cooling module in a fully open state, in a front view according to a first embodiment, FIG. 9 A schematic representation of a part of the device according to the invention for closing a motor vehicle module in a fully open state, in a rear view according to a first embodiment.

FIG. 1 shows a schematic representation of a device 2 according to the invention for closing a motor vehicle cooling module in a fully closed state, in a front view according to a first embodiment.

According to the front view, the arrow indicating the direction of travel R points out of the plane of the sheet.

The present device 2 shows the arrangement of a first and a second closure element 4a, 4b as well as a first and a second closure strip 16a, 16b arranged on the first and second closure element 4a, 4b, respectively. In this case, the closure elements 4a, 4b can each be opened and closed along a vehicle width B and can thus each be displaced between a vehicle center M and the outer regions A1 and A2 along the vehicle width B. For receiving and supporting the closure elements 4a, 4b, the device 2 also has a frame 28 which ensures that the present device 2 can withstand even greater forces and can close air inlets 6 arranged within a vehicle front even at higher driving speeds of a motor vehicle.

FIG. 2 shows a schematic representation of a device 2 according to the invention for closing a motor vehicle cooling module in a fully closed state in a rear view according to a first embodiment. In accordance with the rear view, the arrow indicating the direction of travel R here points into the sheet plane.

As can be seen in the rear view, in addition to the closure elements 4a and 4b for closing air inlets 6, the device 2 also has a first and second control element 10a, 10b for controlling an opening and a closing movement of the closure elements 4a, 4b and a first and second guide element 8a, 8b arranged on the outer regions A1 and A2 respectively for guiding the closure elements 4a, 4b during an opening and a closing movement. In this case, the closure elements 4a, 4b and the guide elements 8a, 8b are arranged relative to one another and can be controlled by the control elements 10a, 10b in such a way that air inlets 6 in a motor vehicle can be opened and closed by the closure elements 4a, 4b along a vehicle width B, wherein two air inlets 6 arranged opposite one another along a vehicle width B can be opened and closed simultaneously by the closure elements 4a, 4b. Furthermore, the closure elements 4a, 4b and the guide elements 8a, 8b are arranged relative to one another and can be controlled by the control elements 10a, 10b in such a way that the closure elements 4a, 4b can be moved from the vehicle centre towards the vehicle outer regions A1, A2 during an opening movement and from the vehicle outer regions A1, A2 towards the vehicle centre during a closing movement.

The present closure elements 4a, 4b can in this case preferably be formed in the form of a textile, in particular in the form of an at least partially air-impermeable textile, such as for example a polyester or polyamide material. The control elements 10a, 10b according to the present invention are formed in the form of shafts and cable pulls 14a, 14b arranged on the shafts in each case, preferably two cable pulls 14 a being provided for the first control element 10a and two cable pulls 14b being provided for the second control element 10b. The cable pulls 14a, 14b can in this case be formed in particular in the form of Bowden cables. The first control element 10a is provided for closing the closure elements 4a, 4b, the first control element 10a being connected to the closure elements 4a, 4b in such a way that the closure elements 4a, 4b can be unwound from the guide elements 8a, 8b during a closing movement, while the cable pulls 14a of the first control element 10a can be wound onto the first control element 10a.

The second control element 10b is further provided for opening the closure elements 4a, 4b, wherein the second control element 10b is connected to the closure elements 4a, 4b in this case in such a way that the closure elements 4a, 4b can be wound onto the guide elements 8a, 8b during an opening movement, while the cable pulls 14b of the second control elements 10b can be unwound at least partially from the second control elements 10b.

The second control element 10b has in this case a centrally arranged first part and in each case a second part arranged in the outer regions A1, A2, present on a first and second guide element 8a, 8b, the first part being connected to the two second parts present via the cable pulls 14b. The control elements 10a, 10b are in this case partially conically shaped, in particular double conically shaped, wherein a first conically shaped part is in this case connected in particular along a waisted region to a second conically shaped region. The conical section serves here in particular to compensate for an increase or decrease in diameter due to the unwinding and winding of the closure elements 4a, 4b around the guide elements 8a, 8b.

In addition to the frame 28, a grid 26 is also provided in the present case for receiving and supporting the closure elements 4a, 4b. Alternatively or cumulatively to a grid 26, a support of a different kind, for example a curved and/or cambered support or the like, may be provided to continuously hold the closure elements 4a, 4b under a slight tension. A drive 20 for driving the control elements 10a, 10b is further provided on the centrally arranged control elements 10a, 10b, which in the present case is formed in the form of a rotary actuator. The rotary actuator drives the control elements 10a, 10b by providing the torque required for an opening or closing process.

FIG. 3 shows a schematic representation of a device 2 according to the invention for closing a motor vehicle cooling module in a fully open state in a front view according to a first embodiment. According to the fully open state, the closure strips 16a, 16b are located in the outer regions A2, A1 and the closure elements 4a, 4b are located in a fully wound state on the guide elements 8a, 8b which are not visible in the present front view. In the presently depicted fully opened state, air inlets 6 are furthermore visible which are to be selectively opened and closed by elements of the present device 2.

FIG. 4 shows a schematic representation of a device 2 according to the invention for closing a motor vehicle cooling module in a partially closed or partially opened state in a front view according to a first embodiment example. Here, in each case only a second opening region 32b is closed by the closure elements 4a, 4b, whereas a respective centrally arranged first opening region 32a is not closed and can thus be cooled by the entry of air through the air inlets 6. It has been found that such an arrangement in which, for example, only brake air ducts arranged in the outer regions A1, A2 are closed by the closure elements 4a, 4b can be advantageous.

FIG. 5 shows a schematic representation of a part of the device 2 according to the invention for closing a motor vehicle cooling module in a fully closed state, in a rear view according to a first embodiment.

According to this partial representation, only the closure elements 4a, 4b, the guide elements 8a, 8b and the first and second drive elements 10a, 10b for controlling the closure elements 4a, 4b are shown. As can be seen in the present embodiment, the control elements 10a, 10b are formed in the form of shafts and cable pulls 14a, 14b arranged on the shafts respectively, wherein two cable pulls 14a are provided for the first control element 10a and two cable pulls 14b are provided for the second control element 10b respectively. The first control element 10a is provided in this case for closing the closure elements 4a, 4b, whereas the second control element 14b is provided for opening the closure elements 4a, 4b and has a first centrally arranged part and in each case a second part arranged in the outer regions A1, A2, presently on the first and second guide elements 8a, 8b, the first part being connected to the two second parts presently via the cable pulls 14b. Moreover, the drive 20, which is presently formed in the form of an actuator, can be seen presently arranged on the centrally arranged drive shaft 36 together with the first control element 10a and the first part of the second control element 10b.

FIGS. 6a and 6b show a schematic representation of a closure strip 16a according to the invention in an open and a closed state.

The end strips 16a, 16b are provided in the present case for fastening the closure elements 4a, 4b to the control elements 10a, 10b, the end strips 16a, 16b having a first end strip element 24a and a second end strip element 24b for fastening the closure elements 4a, 4b, the closure elements 4a, 4b preferably being clampable between the first and second end strip elements 24a, 24b. As illustrated presently with reference to an embodiment of the first end strip 16a, the end strip 16a may comprise clip connections 29, 30 for fastening the closure elements 4a, 4b, the clip connections 29, 30 being formed in particular in the form of clips 30 arranged in the first end strip element 24a and corresponding recesses 29 arranged in the second end strip element 24b. Furthermore, the tension elements 18 provided for connecting the end strips 16a, 16b and/or the closure elements 4a, 4b to the first control element 10a can be seen in the present case, which tension elements is formed in the present case in the form of a tension spring.

In the open state shown here according to FIG. 6a, a closure element 4a, 4b can be inserted in a simple manner into the closure strip 16a and then be positively secured in the closure strip 16a by placing the second closure strip element 24b according to FIG. 6b.

FIGS. 7a and 7b show a schematic representation of the control elements 10a, 10b according to the invention for controlling an opening and a closing movement of a closure element 4a, 4b according to the invention.

In FIG. 7a, the arrangement of a drive 20 of a first control element 10a with cables 14a arranged on a drive shaft 36 and the first part of the second control element 10b with cables 14b for connection to the second part of the second control element 10b shown in FIG. 7b is shown here once again.

FIG. 8 shows a schematic representation of a part of the device 2 according to the invention for closing a motor vehicle cooling module in a fully open state, in a front view according to a first embodiment.

According to this view, in particular the arrangement of the cable 14a guided inside the frame 28 can be seen, as well as its connection to the first end strip 16a.

FIG. 9 shows a schematic representation of a part of the device 2 according to the invention for closing a motor vehicle cooling module in a fully open state in a rear view according to a first embodiment example According to this representation, in addition to the cable 14b of the second control element 10b, which is also guided within the frame 28, the intermediate element 34 for stabilizing a guide of the closure elements 4a, 4b, which is arranged within the first end strip 16a, can be seen, which is formed in the present case in the form of a T-profile-shaped guide and is part of the end strip 16a.

By elements of the device 2 according to the invention, it is possible in particular to cool subregions of an engine compartment arranged symmetrically along a vehicle width B as required by moving a first and a second closure element 4a, 4b along a vehicle width B, the movement being effected simultaneously from two positions arranged opposite one another along a vehicle width B symmetrically towards one another or away from one another. In particular, by elements of the opening provided in accordance with the invention from a vehicle centre M towards the vehicle outer regions A1, A2 or by elements of the closing provided in accordance with the invention from the vehicle outer regions A1, A2 towards the vehicle centre M, it is possible to supply cooling air only to a centrally arranged vehicle front region and to be able to exclude parts arranged in the outer regions of a vehicle front from ventilation accordingly, which has proved to be particularly advantageous for some applications.

LIST OF REFERENCE SIGNS

2 Device for closing a motor vehicle cooling module
4a first closing element
4b second closing element
6 Air inlets
8 first guiding element
8 second guiding element
10 first control element
10b second control element
14a Cable pull of the first control element
14b Cable pull of the second control element
16 first end strip
16 Second end strip
20 Drive
24 first end strip element
24 second end strip element
26 Lattice grid
28 Frame
29 Recesses
30 Clip connection
32a first opening region
32b second opening region
34 Intermediate element
36 Drive shaft
R travel
W width of vehicle
M Middle
A1 first outer region
A2 second outer region

The invention claimed is:

1. A device for closing a motor vehicle cooling module, comprising
a first and second closure element for closing air inlets in a motor vehicle,
a first and a second guide element for guiding the closure elements during an opening and a closing movement,
a first and a second control elements for controlling an opening and a closing movement of the closure elements,
wherein the closure elements and the guide elements are arranged relative to one another and can be controlled by the control elements in such a way that air inlets in a motor vehicle can be opened and closed by the closure elements along a vehicle width, wherein two air inlets arranged opposite one another along a vehicle width can be opened and closed simultaneously by the closure elements, wherein the closure elements and the guide elements are arranged with respect to one another and can be controlled by the control elements in such a way that the closure elements can be moved from the vehicle center towards the vehicle outer regions during an opening movement and from the vehicle outer regions towards the vehicle center during a closing movement, the second control element is provided for opening the closure elements, the second control element being connected to the closure elements in such a way that the closure elements can be wound onto the guide elements during an opening movement, while the cable pulls of the second control element can be unwound at least partially from the second control element, wherein a first and second end strip is provided for securing the closure elements to the control elements, wherein the end strips have a first end strip element and a second end strip element for fastening the closure elements, wherein the closure elements can be clamped between the first and second end strip elements.

2. The device according to claim 1, wherein the closure elements are formed in the shape of a textile.

3. The device according to claim 1, wherein the closure elements have sections which are kedered at the ends in order to produce a stable connection to the guide elements.

4. The device according to claim 1, wherein the guide elements are formed in the form of winding shafts onto which the closure elements can be wound during an opening movement and from which the closure elements can be unwound during a closing movement.

5. The device according to claim 1, wherein the guide elements have a recess arranged on the longitudinal side for the introduction of the closure elements.

6. The device according to claim 1, wherein the guide elements are arranged on the outer regions of the device, the guide elements.

7. The device according to claim 4, wherein the control elements are formed in the form of shafts and cable pulls arranged in each case on the shafts.

8. The device of claim 7, wherein the cable pulls are formed in the form of Bowden cables.

9. The device according to claim 7, wherein
the first control element is provided for closing the closure elements, the first control element being connected to the closure elements in such a way that the closure elements can be unwound from the guide elements during a closing movement, while the cable pulls of the first control element can be wound onto the first control element.

10. The device according to claim 7, wherein the second control element has a first centrally arranged part and in each case a second part arranged in the outer regions, the first part being connected to the two second parts preferably via cable pulls.

11. The device according to claim 1, wherein the control elements are at least partially conically shaped, a first conically shaped part being connected, to a second conically shaped region.

12. The device according to claim 1, wherein the end strip has clip connections for fastening the closing elements.

13. The device according to claim 1, wherein the end strip has an intermediate element for stabilizing a guide.

14. The device according to claim 1, wherein a tension element is provided for connecting the end strip or the closing elements to the first control element.

15. The device according to claim 1, wherein the end strips have a recess for insertion of the cable of the first control element.

16. The device according to claim 1, wherein at least one drive is provided for driving the control elements.

17. The device according to claim 14, wherein a centrally arranged drive shaft is provided.

18. The device according to claim 1, wherein a frame or a grid is provided for receiving and supporting the closure element.

19. The device according to claim 1, wherein a detection unit is provided for acquiring data for determining a current position of the closure elements with respect to at least one of a vehicle width, a current temperature, a current tensile stress, a current speed, or a current energy consumption.

20. The device according to claim 14, wherein a processing unit is provided for sending a control command to the drive on the basis of the detected data.

21. A motor vehicle, comprising a device for closing a motor vehicle cooling module according to claim 1.

* * * * *